United States Patent
Shacham et al.

(10) Patent No.: US 10,157,153 B2
(45) Date of Patent: Dec. 18, 2018

(54) INLINE CRYPTOGRAPHIC ENGINE (ICE) FOR PERIPHERAL COMPONENT INTERCONNECT EXPRESS (PCIE) SYSTEMS

(71) Applicant: QUALCOMM Incorporated, San Diego, CA (US)

(72) Inventors: Assaf Shacham, Zichron Yaakov (IL); Eyal Skulsky, Zichron Yaakov (IL); Shaul Yohai Yifrach, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 15/014,158

(22) Filed: Feb. 3, 2016

(65) Prior Publication Data

US 2017/0220494 A1 Aug. 3, 2017

(51) Int. Cl.
*G06F 13/00* (2006.01)
*G06F 13/42* (2006.01)
*G06F 13/16* (2006.01)
*G06F 13/40* (2006.01)
*G06F 12/14* (2006.01)
*G06F 13/38* (2006.01)
(Continued)

(52) U.S. Cl.
CPC ...... *G06F 13/1673* (2013.01); *G06F 12/1408* (2013.01); *G06F 12/1466* (2013.01); *G06F 13/385* (2013.01); *G06F 13/4068* (2013.01); *G06F 13/4282* (2013.01); *G06F 21/602* (2013.01); *G06F 21/85* (2013.01); *G06F 2212/402* (2013.01)

(58) Field of Classification Search
None
See application file for complete search history.

(56) References Cited

U.S. PATENT DOCUMENTS 8,321,659 B2 * 11/2012 Haneda .................. G06F 21/72
                                                       713/150
8,832,331 B2   9/2014 Co
9,152,825 B2  10/2015 Sarcone
(Continued)

OTHER PUBLICATIONS

International Search Report and Written Opinion for PCT/US2016/068865, dated Apr. 25, 2017, 12 pages.
(Continued)

*Primary Examiner* — Michael Sun
(74) *Attorney, Agent, or Firm* — Withrow & Terranova, PLLC

(57) ABSTRACT

Aspects disclosed in the detailed description include inline cryptographic engine (ICE) for peripheral component interconnect express (PCIe). In this regard, in one aspect, an ICE is provided in a PCIe root complex (RC) in a host system. The PCIe RC is configured to receive at least one transport layer packet (TLP), which includes a TLP prefix, from a storage device. In a non-limiting example, the TLP prefix includes transaction-specific information that may be used by the ICE to provide data encryption and decryption. By providing the ICE in the PCIe RC and receiving the transaction-specific information in the TLP prefix, it is possible to encrypt and decrypt data in the PCIe RC in compliance with established standards, thus ensuring adequate protection during data exchange between the PCIe RC and the storage device.

26 Claims, 7 Drawing Sheets

(51) Int. Cl.
    *G06F 21/85* (2013.01)
    *G06F 21/60* (2013.01)

(56) References Cited

U.S. PATENT DOCUMENTS

| | | | |
|---|---|---|---|
| 9,749,319 B2* | 8/2017 | Serebrin | G06F 12/1475 |
| 9,762,547 B2* | 9/2017 | Binder | H04L 63/18 |
| 2004/0179534 A1* | 9/2004 | Pettey | H04L 67/24 |
| | | | 370/395.5 |
| 2006/0288203 A1* | 12/2006 | Iwata | G06F 21/85 |
| | | | 713/151 |
| 2008/0052728 A1* | 2/2008 | Steinmetz | G06F 13/426 |
| | | | 719/313 |
| 2008/0140932 A1* | 6/2008 | Flynn | G06F 1/183 |
| | | | 711/114 |
| 2013/0054850 A1 | 2/2013 | Co | |
| 2013/0212321 A1* | 8/2013 | Talagala | G06F 12/0246 |
| | | | 711/103 |
| 2014/0281070 A1* | 9/2014 | Natu | G06F 13/385 |
| | | | 710/105 |
| 2014/0281099 A1 | 9/2014 | Avez et al. | |
| 2014/0344488 A1* | 11/2014 | Flynn | G06F 5/14 |
| | | | 710/52 |
| 2015/0046702 A1 | 2/2015 | Paaske et al. | |
| 2017/0185804 A1* | 6/2017 | Elbaz | G06F 13/287 |

OTHER PUBLICATIONS

Author Unknown, "PCI Express® Base Specification," PCI Express, Revision 3.0, Nov. 10, 2010, PCI-SIG, 860 pages.
International Preliminary Report on Patentability for PCT/US2016/068865, dated Feb. 9, 2018, 6 pages.

* cited by examiner

INLINE CRYPTOGRAPHIC ENGINE (ICE) FOR PERIPHERAL COMPONENT INTERCONNECT EXPRESS (PCIE) SYSTEMS

BACKGROUND

I. Field of the Disclosure

The technology of the disclosure relates generally to peripheral component interconnect express (PCIe).

II. Background

Mobile communication devices have become increasingly common in current society. The prevalence of these mobile communication devices is driven in part by the many functions that are now enabled on such devices. Increased processing capabilities in such devices means that mobile communication devices have evolved from being purely communication tools into sophisticated mobile multimedia centers, thus enabling enhanced user experiences.

Data processing elements (e.g., application processors, graphic processors, etc.) in mobile communication devices rely on storage devices to store a variety of system and user data. Such storage devices may include a hard-disk drive (HDD), a solid-state disk (SSD), a universal flash storage (UFS), a universal serial bus (USB) storage device, and/or an embedded multimedia card (eMMC).

Concurrent with the increased processing capabilities of mobile communication devices, demand for data storage capacity has also grown exponentially. As a result, it is not uncommon for mobile communication devices to be embedded with storage devices that are capable of storing hundreds of gigabytes (GBs) of data. The storage devices are typically connected to the data processing elements through peripheral interfaces, such as a peripheral component interconnect express (PCIe) interface. The mobile communication devices are required to provide adequate protection against unauthorized access and/or malicious attack to the variety of system and user data stored in the storage devices. As a result, encryption is often needed when data is stored in the storage devices and exchanged between the storage devices and the data processing elements.

SUMMARY OF THE DISCLOSURE

Aspects disclosed in the detailed description include inline cryptographic engine (ICE) for peripheral component interconnect express (PCIe) systems. In this regard, in one aspect, an ICE is provided in a PCIe root complex (RC) in a host system. The PCIe RC is configured to receive at least one transport layer packet (TLP), which includes a TLP prefix, from a storage device. In a non-limiting example, the TLP prefix includes transaction-specific information that may be used by the ICE to provide data encryption and decryption. By providing the ICE in the PCIe RC and receiving the transaction-specific information in the TLP prefix, it is possible to encrypt and decrypt data in the PCIe RC in compliance with established standards, thus ensuring adequate protection during data exchange between the PCIe RC and the storage device.

In this regard, in one aspect, a host system is provided. The host system comprises at least one processor coupled to a system bus. The host system also comprises a memory controller coupled to the system bus and configured to control a memory. The host system also comprises a PCIe RC comprising an ICE. The PCIe RC is coupled to the system bus and configured to receive at least one TLP from a storage device communicatively coupled to the PCIe RC. The at least one TLP comprises a TLP prefix that includes a data indicator, a task tag (TT), and a data buffer offset (DBO).

In another aspect, a method for supporting an ICE in a PCIe RC is provided. The method comprises receiving at least one TLP comprising a TLP prefix that includes a data indicator, a TT, and a DBO. The method also comprises extracting the TT and the DBO from the TLP prefix if the data indicator in the TLP prefix indicates that transaction-specific information is present in the TLP prefix. The method also comprises retrieving a logical block address (LBA) and a secret key based on the TT. The method also comprises computing an initialization vector (IV) based on the DBO, the LBA, and the secret key.

In another aspect, a storage device is provided. The storage device is configured to couple to a PCIe RC in a host system. The storage device comprises a host interface controller. The host interface controller is configured to receive a request from the host system. The host interface controller is also configured to read a transaction descriptor corresponding to the request from the host system and extract a TT from the transaction descriptor. The host interface controller is also configured to send at least one TLP to the PCIe RC. The at least one TLP comprises a TLP prefix that includes a data indicator configured to indicate that transaction-specific information is present in the TLP prefix.

In another aspect, an electronic device is provided. The electronic device comprises a memory. The electronic device also comprises a host system. The host system comprises at least one processor coupled to a system bus. The host system also comprises a memory controller coupled to the system bus and configured to control the memory. The host system also comprises a PCIe RC coupled to the system bus and comprising an ICE. The electronic device also comprises a storage device. The storage device comprises a host interface controller communicatively coupled to the PCIe RC. The host interface controller in the storage device is configured to receive a request from the at least one processor in the host system. The host interface controller in the storage device is also configured to read a transaction descriptor corresponding to the request from the host system and extract a TT from the transaction descriptor. The host interface controller in the storage device is also configured to send at least one TLP to the PCIe RC. The at least one TLP comprises a TLP prefix that includes a data indicator configured to indicate that transaction-specific information is present in the TLP prefix. The PCIe RC in the host system is configured to receive the at least one TLP from the storage device. The PCIe RC in the host system is also configured to extract the TT and a DBO from the TLP prefix if the data indicator in the TLP prefix indicates that the transaction-specific information is present in the TLP prefix. The PCIe RC in the host system is also configured to retrieve an LBA and a secret key stored at the ICE based on the TT. The PCIe RC in the host system is also configured to compute an IV based on the DBO, the LBA, and the secret key.

In another aspect, a method for providing transaction-specific information to a host system is provided. The method comprises receiving a request from the host system. The method also comprises reading a transaction descriptor corresponding to the request from the host system and extracting a TT from the transaction descriptor. The method also comprises sending at least one TLP to a PCIe RC in the host system. The at least one TLP comprises a TLP prefix that includes a data indicator configured to indicate that the transaction-specific information is present in the TLP prefix.

DETAILED DESCRIPTION

Figure 1:
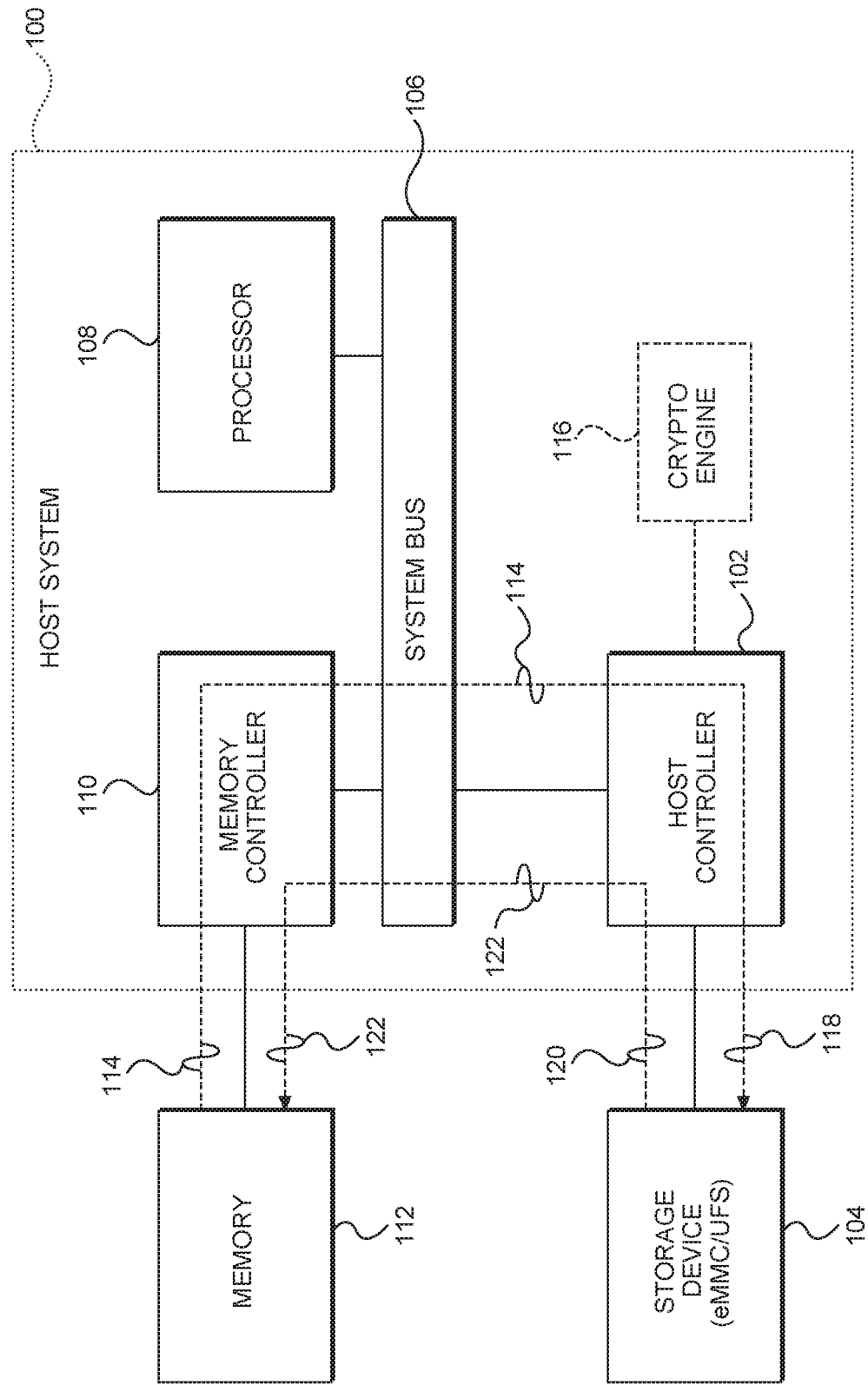
FIG. 1 is schematic diagram of an exemplary conventional host system that includes a host controller configured to encrypt and decrypt data for a storage device controlled by the host controller.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include inline cryptographic engine (ICE) for peripheral component interconnect express (PCIe) systems. In this regard, in one aspect, an ICE is provided in a PCIe root complex (RC) in a host system. The PCIe RC is configured to receive at least one transport layer packet (TLP), which includes a TLP prefix, from a storage device. In a non-limiting example, the TLP prefix includes transaction-specific information that may be used by the ICE to provide data encryption and decryption. By providing the ICE in the PCIe RC and receiving the transaction-specific information in the TLP prefix, it is possible to encrypt and decrypt data in the PCIe RC in compliance with established standards, thus ensuring adequate protection during data exchange between the PCIe RC and the storage device.

Before discussing exemplary aspects of ICE for PCIe that include specific aspects of the present disclosure, a brief overview of conventional host system for encrypting/decrypting data to be stored in a universal flash storage (UFS) or an embedded multimedia card (eMMC) is first provided in FIG. 1. A brief overview of a host system configured to support a storage device as a PCIe endpoint (EP) is then discussed with reference to FIG. 2. The discussion of specific exemplary aspects of ICE for PCIe starts with reference to FIG. 3.

In this regard, FIG. 1 is schematic diagram of an exemplary conventional host system 100 that includes a host controller 102 configured to encrypt and decrypt data for a storage device 104 controlled by the host controller 102. The host controller 102 is coupled to a system bus 106. The conventional host system 100 also includes at least one processor 108 and a memory controller 110. Both the processor 108 and the memory controller 110 are also coupled to the system bus 106. The memory controller 110 is configured to control a memory 112, which may be a dynamic random access memory (DRAM), for example.

When the processor 108 needs to write data from the memory 112 to the storage device 104, the processor 108 instructs the host controller 102 to read unencrypted data 114 from the memory 112 via the memory controller 110. The host controller 102 then configures a cryptographic engine 116 (also referred to as crypto engine 116 in FIG. 1) to encrypt the unencrypted data 114 into an encrypted data 118 and write the encrypted data 118 to the storage device 104. When the processor 108 needs to read data from the storage device 104 to the memory 112, the processor 108 instructs the host controller 102 to read encrypted data 120 from the storage device 104. The host controller 102 then configures the cryptographic engine 116 to decrypt the encrypted data 120 into unencrypted data 122 and writes the unencrypted data 122 to the memory 112.

In a non-limiting example, the cryptographic engine 116 may be provided inside or outside the host controller 102. The cryptographic engine 116 may employ an encryption algorithm to encrypt the unencrypted data 114 into the encrypted data 118. Likewise, the cryptographic engine 116 may employ a decryption algorithm, which may be the same as or different from the encryption algorithm, to decrypt the encrypted data 120 into the unencrypted data 122. In a non-limiting example, the encryption algorithm and the decryption algorithm may be advanced encryption standard (AES) Xor-Encrypt-Xor (XEX) Tweakable Block Cipher with Ciphertext Stealing (XTS) (AES-XTS) algorithm or AES Cipher Block Chaining (CBC) (AES-CBC) algorithm.

The encryption algorithm and the decryption algorithm are configured to encrypt the unencrypted data 114 and decrypt the encrypted data 120, respectively, based on an initialization vector (IV). In a non-limiting example, the host controller 102 may compute the IV as a function of a secret key, a logical block address (LBA), and a data buffer offset (DBO), as expressed in the equation (Eq. 1) below.

$$IV = f_{CRYPTO}(\text{Secret Key}, \text{LBA}, \text{DBO}) \qquad \text{Eq. 1}$$

In a non-limiting example, the unencrypted data 114 is stored in the memory 112 as a four kilobytes (4 KB) data block, and the LBA is configured to address the 4 KB data block. Accordingly, the IV computed according to Eq. 1 corresponds to the LBA. The host controller 102 may further fragment the 4 KB data block into smaller data blocks (not shown) and address each of the smaller data blocks by a respective DBO. The host controller 102 may store the respective DBO locally (e.g., in cache memory) and receive the secret key and the LBA from the processor 108. As such, the host controller 102 is able to compute the IV for data encryption/decryption based on Eq. 1 above.

With continuing reference to FIG. 1, since the host controller 102 is dedicated to controlling the storage device 104, the conventional host system 100 will require multiple host controllers to support multiple storage devices. For example, the conventional host system 100 will require a UFS host controller and an eMMC host controller if the conventional host system 100 is configured to support a UFS-based storage device and an eMMC-based storage device. The multiple host controllers included in the conventional host system 100 may result in increased costs, footprint, and design complexity of the conventional host system 100. As a result, a PCIe based host system architecture has emerged as an alternative to the conventional host system 100.

Figure 2:
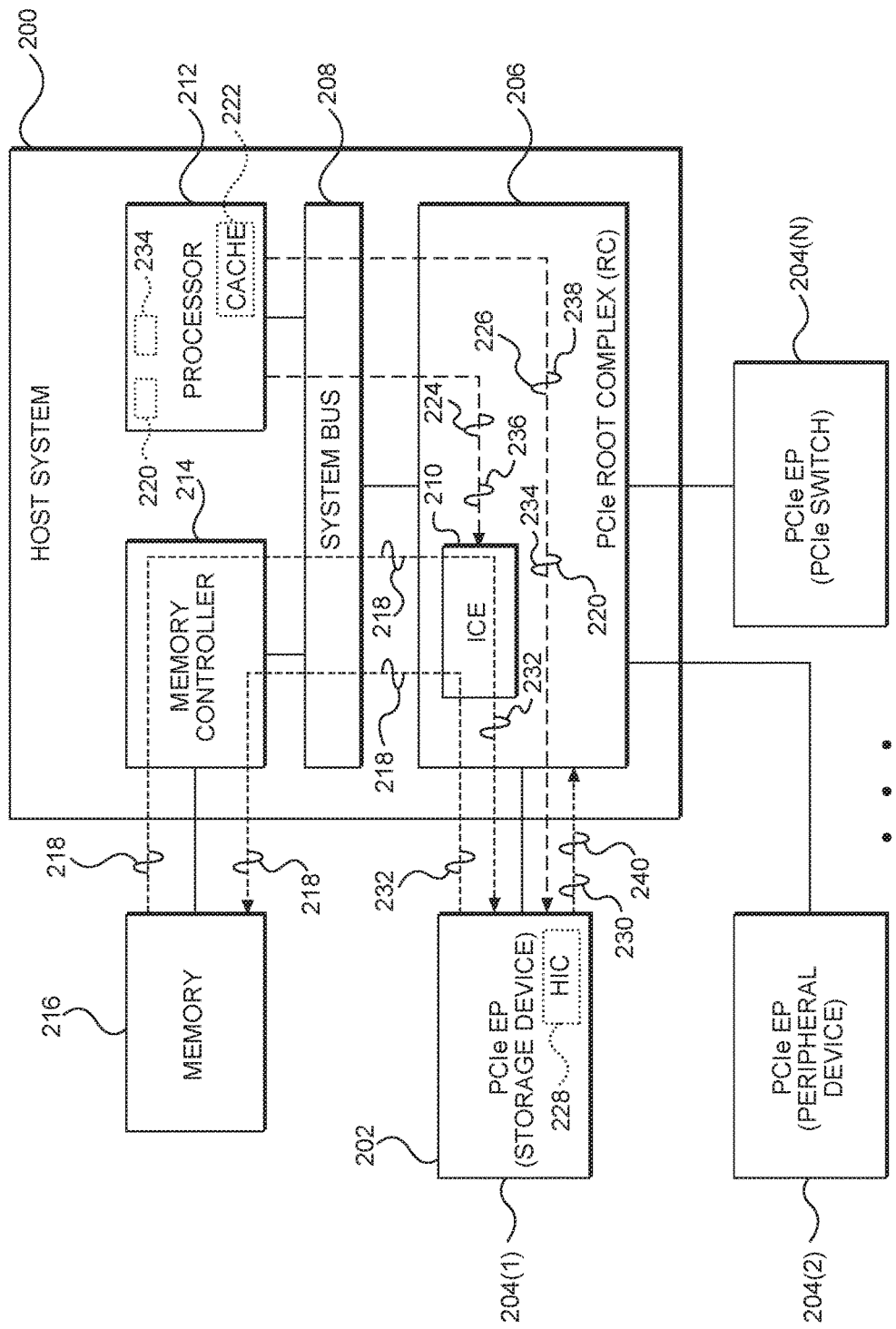
FIG. 2 is a schematic diagram of a host system configured to support a storage device as one of a plurality of peripheral component interconnect express (PCIe) endpoints (EPs)

In this regard, FIG. 2 is a schematic diagram of a host system 200 configured to support a storage device 202 as one of a plurality of PCIe EPs 204(1)-204(N). The host system 200 includes a PCIe RC 206 configured to control the plurality of PCIe EPs 204(1)-204(N). In a non-limiting example, the PCIe EP 204(1) is the storage device 202, which may be a flash storage device. The PCIe EP 204(2) may be another integrated circuit or a peripheral device. The PCIe EP 204(N) may be a PCIe switch connecting to more PCIe EPs (e.g., legacy PCIe EPs). Communications between the PCIe RC 206 and the plurality of PCIe EPs 204(1)-204(N) are based on TLPs and in accordance with a non-volatile memory express (NVMe) protocol. Each TLP includes address information enabling the PCIe RC 206 to route the TLP correctly among the plurality of PCIe EPs 204(1)-204(N). In this regard, the PCIe RC 206 is analogous to a router of an internet-protocol (IP) network and the TLPs are analogous to IP packets communicated in the IP network.

The PCIe RC 206 is coupled to a system bus 208 and may include an ICE 210 for data encryption and decryption. In a non-limiting example, the ICE 210 may be provided as a hardware component in the PCIe RC 206. The ICE 210 may be configured to implement encryption and decryption algorithms such as the AES-XTS algorithm and/or the AES-CBC algorithm. As such, the ICE 210 is also configured to carry out data encryption and decryption using the IV computed according to Eq. 1. However, since the TLPs communicated between the PCIe RC 206 and the PCIe EPs 204(1)-204(N) do not inherently carry the LBA and DBO, the ICE 210 may have difficulty in computing the IV based on Eq. 1.

The host system 200 also includes at least one processor 212 and a memory controller 214. The processor 212 and the memory controller 214 are both coupled to the system bus 208 and are able to exchange the TLPs with the PCIe RC 206. The memory controller 214 is configured to control a memory 216, which may be a DRAM, for example. According to the NVMe protocol, when the processor 212 needs to write unencrypted data 218 associated with an LBA from the memory 216 into the storage device 202, the processor 212 creates a transaction descriptor 220 for a write task. According to previous discussions with reference to FIG. 1, the unencrypted data 218 may be stored in the memory 216 as a 4 KB data block and addressed by the LBA. In a non-limiting example, the processor 212 may store the transaction descriptor 220 in the memory 216 or in a cache memory 222. The transaction descriptor 220 may include a write command and a first task tag (TT) associated with the LBA. Next, the processor 212 creates the write task in association with the first TT, the LBA, and a secret key at the ICE 210. In a non-limiting example, the processor 212 may create the write task via a write task signal 224. The ICE 210 may in turn store the first TT, the LBA, and the secret key in a local cache (not shown). Continuing the example, the ICE 210 may create an LBA and key array (not shown). The LBA and key array may include a plurality of LBA and key entries each configured to store a respective pair of LBAs and secret keys in association with a respective TT. The ICE 210 may store the LBA and the secret key in association with the first TT as one or more of the plurality of LBA and key entries in the LBA and key array. As such, the ICE 210 is able to retrieve the LBA and the secret key based on the first TT.

Subsequently, the processor 212 sends a write request 226 to a host interface controller 228 in the storage device 202. In response to receiving the write request 226, the host interface controller 228 may be configured to read the transaction descriptor 220 from the host system 200 to obtain the write command and the first TT. The host interface controller 228 then sends a memory read request 230 to the PCIe RC 206. According to the NVMe protocol, the host interface controller 228 may send the memory read request 230 in at least one TLP.

In response to receiving the memory read request 230, the PCIe RC 206 fetches the unencrypted data 218, which is the 4 KB data block addressed by the LBA, from the memory 216 via the memory controller 214. The PCIe RC 206 then configures the ICE 210 to encrypt the unencrypted data 218 into an encrypted data 232 that is also 4 KB in size. The PCIe RC 206 then provides the encrypted data 232 to the host interface controller 228 in the storage device 202. The host interface controller 228 fragments the encrypted data 232 received from the PCIe RC 206 into smaller data blocks (not shown) before writing to the storage device 202. In a non-limiting example, each of the smaller data blocks may be one hundred twenty-eight bytes (128 B) and the host interface controller 228 may assign a respective DBO to each of the 128 B data blocks. Since the host interface controller 228 in the storage device 202 is configured to assign the respective DBO, the PCIe RC 206 is no longer aware of the respective DBO being assigned to the encrypted data 232.

With continuing reference to FIG. 2, when the processor 212 needs to read the encrypted data 232 from the storage device 202 into the memory 216, the processor 212 creates a transaction descriptor 234 for a read task. In a non-limiting example, the processor 212 may store the transaction descriptor 234 in the memory 216 or in the cache memory 222. The transaction descriptor 234 may include a read command and a second TT. Next, the processor 212 creates the read task in association with the second TT, the LBA, and the secret key at the ICE 210. In a non-limiting example, the processor 212 may create the read task via a read task signal 236. The ICE 210 may store the LBA and the secret key in association with the second TT as one or more of the plurality of LBA and key entries in the LBA and key array. As such, the ICE 210 is able to retrieve the LBA and the secret key based on the second TT.

Subsequently, the processor 212 sends a read request 238 to the host interface controller 228 in the storage device 202. In response to receiving the read request 238, the host interface controller 228 may be configured to read the transaction descriptor 234 from the host system 200 to obtain the read command and the second TT. The host interface controller 228 then sends a memory write request 240 to the PCIe RC 206. According to the NVMe protocol, the host interface controller 228 may send the memory write request 240 in at least one TLP. The TLP includes the encrypted data 232, and the PCIe RC 206 can extract the encrypted data 232 from the memory write request 240. The PCIe RC 206 then configures the ICE 210 to decrypt the encrypted data 232 into the unencrypted data 218 and provides the unencrypted data 218 to the memory 216 via the memory controller 214.

As discussed above, the PCIe RC 206 needs to configure the ICE 210 to encrypt the unencrypted data 218 into the encrypted data 232 and/or decrypt the encrypted data 232 into the unencrypted data 218. As the ICE 210 may be configured to carry out data encryption and decryption using the AES-XTS algorithm and/or the AES-CBC algorithm, the PCIe RC 206 needs to compute the IV for the AES-XTS and/or AES-CBC algorithm. As such, according to Eq. 1, the PCIe RC 206 needs to possess the secret key, the LBA, and the DBO. However, as discussed earlier, the PCIe RC 206 has no knowledge about the DBO that was assigned to the encrypted data 232 by the host interface controller 228 in the storage device 202. Hence, it is necessary for the host interface controller 228 in the storage device 202 to convey the DBO to the PCIe RC 206 to allow the PCIe RC 206 to compute the IV. Moreover, it is desirable that the host interface controller 228 can convey the DBO to the PCIe RC 206 in accordance to the NVMe protocol.

Figure 3:
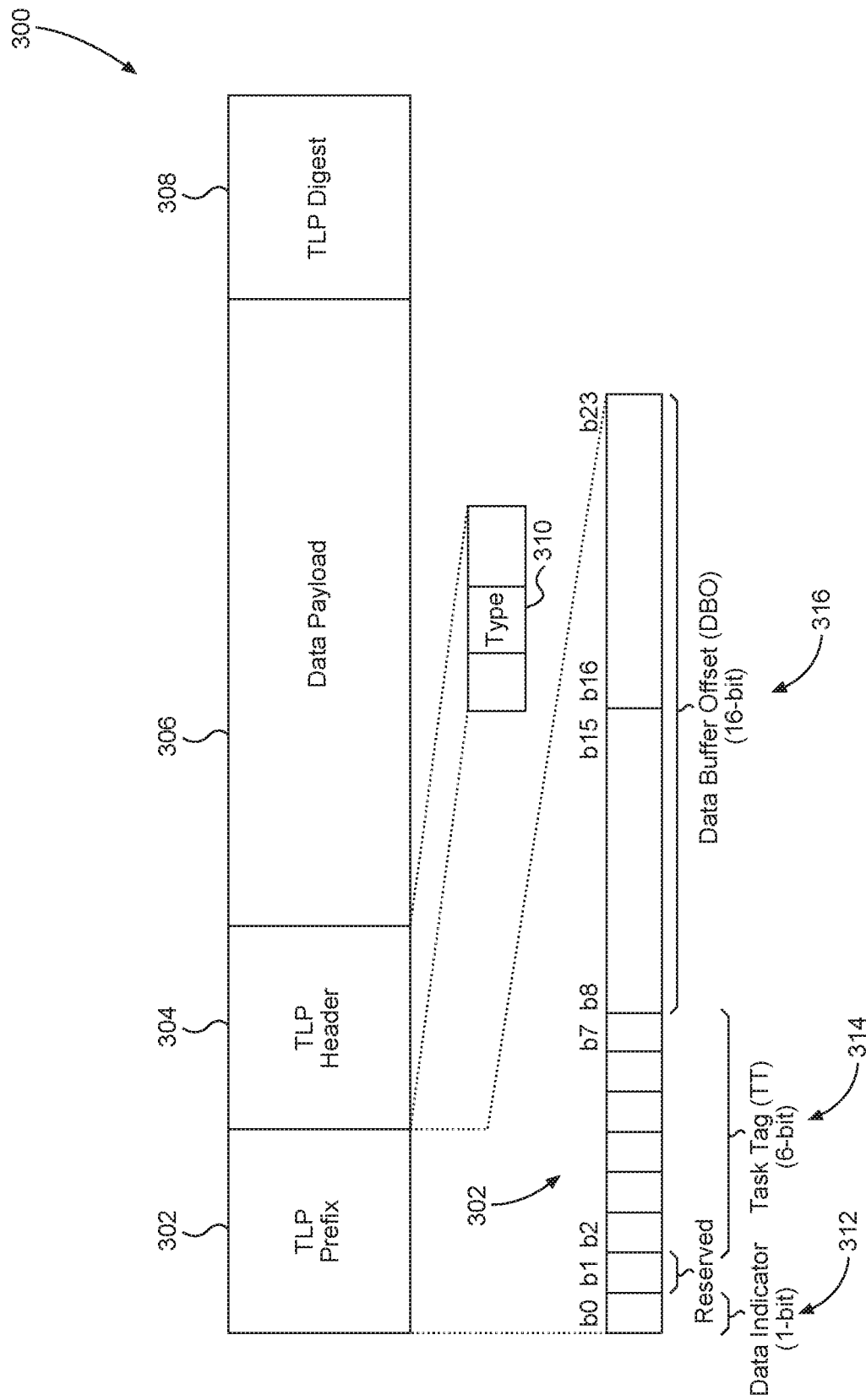
FIG. 3 is a schematic diagram of an exemplary transport layer packet (TLP) format in which a TLP prefix is configured to convey transaction-specific information from the storage device to a PCIe root complex (RC) in the host system of FIG. 2.

The PCIe Base Specification Revision 3.0 (hereinafter referred to as "PCIe specification"), which was published by the PCI special interest group (PCI-SIG) on Nov. 10, 2010, allows a TLP to include one or more optional TLP prefixes. As such, it may be possible for the host interface controller 228 to convey the DOB to the PCIe RC 206 using the one or more optional TLP prefixes defined in the PCIe specification. In this regard, FIG. 3 is a schematic diagram of an exemplary TLP 300 in which a TLP prefix 302 is configured to convey transaction-specific information from the host interface controller 228 in the storage device 202 to the PCIe RC 206 in the host system 200 of FIG. 2. Common elements between FIGS. 2 and 3 are shown therein with common element numbers and will not be re-described herein.

According to the PCIe specification, the TLP 300 includes the TLP prefix 302, a TLP header 304, a data payload 306, and a TLP digest 308. The TLP header 304 includes a type field 310 that may be configured to indicate whether the TLP 300 is encoded as the memory read request 230 (not shown) or the memory write request 240 (not shown). The TLP prefix 302 includes a data indicator 312, a TT 314, and a DBO 316. Hereinafter, the TT 314 and the DBO 316 are collectively referred to as the transaction-specific information. The data indicator 312 is one bit (1-bit) in length and located at bit zero (b0) in the TLP prefix 302. In a non-limiting example, the data indicator 312 is set to one (1) or zero (0) to indicate whether the transaction-specific information is present or absent in the TLP prefix 302. Bit 1 (b1) of the TLP prefix 302 may be reserved.

With continuing reference to FIG. 3 and continuing the example, the TT 314 is six bits (6-bit) in length and located from bit two (b2) to bit seven (b7) in the TLP prefix 302. As such, the TT 314 is configured to support up to sixty-four (64) concurrent read/write tasks initiated by the processor 212 (not shown). The DBO 316 is sixteen bits (16-bit) in length and located from bit eight (b8) to bit twenty-three (b23) in the TLP prefix 302. In this regard, the DBO 316 can identify up to two to the power of sixteen ($2^{16}$) DBOs. If each of the $2^{16}$ DBOs corresponds to a 128 B data block, as in the non-limiting example provided in FIG. 2, then the DBO 316 can cover up to eight megabytes (8 MB) ($2^{16} \times 128$ B=8 MB) address space in the storage device 202 (not shown). As further discussed next in FIGS. 4 and 5, the host interface controller 228 (not shown) may include the TLP prefix 302 in the memory read request 230 and the memory write request 240 to convey the transaction-specific information to the PCIe RC 206 (not shown), thus enabling the PCIe RC 206 to compute the IV for data encryption and decryption.

Figure 4:
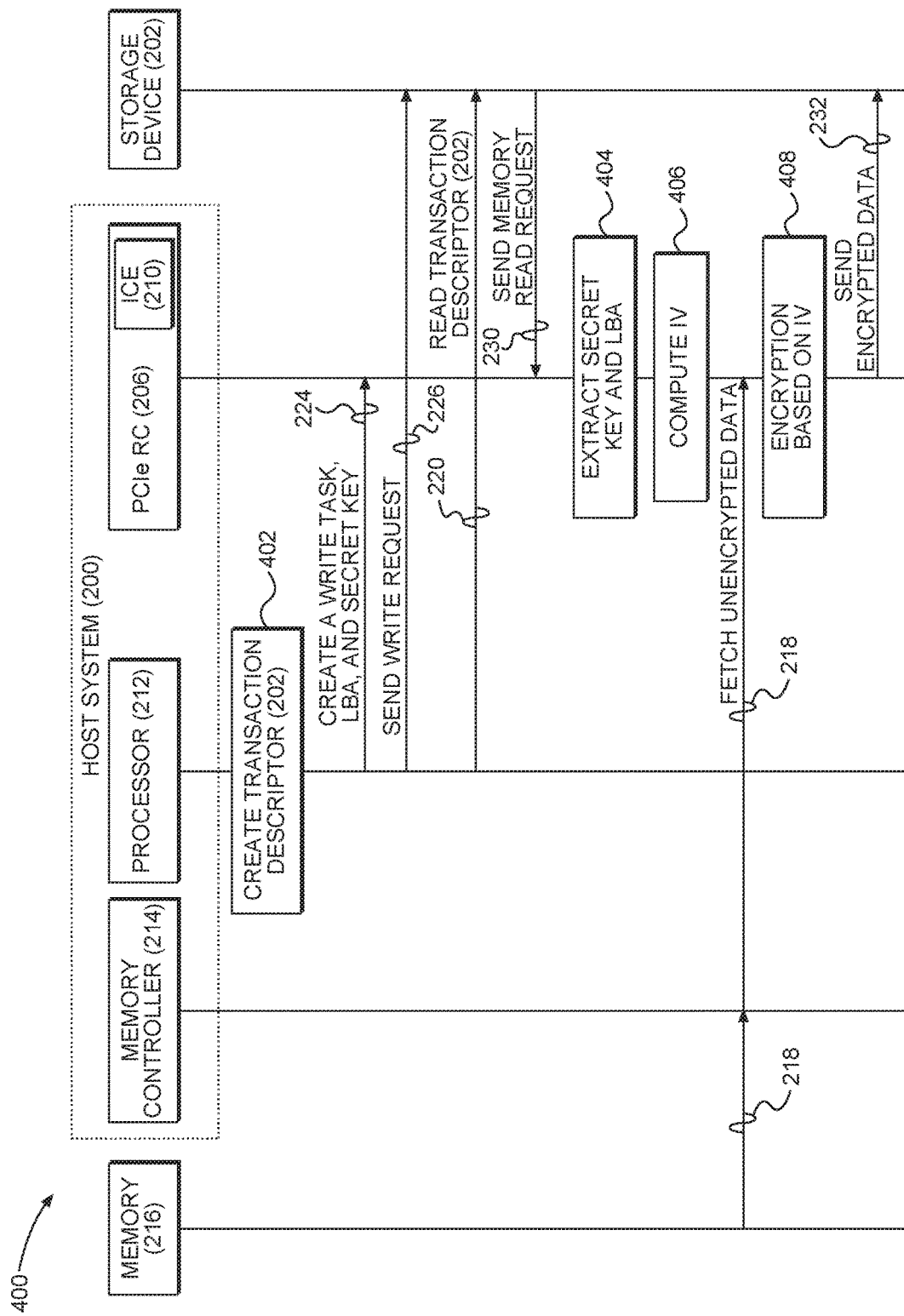
FIG. 4 is a signal flow diagram providing an exemplary illustration of conveying the transaction-specific information using the TLP prefix of FIG. 3 to enable data encryption in the host system of FIG. 2.

In this regard, FIG. 4 is a signal flow diagram 400 providing an exemplary illustration of conveying the transaction-specific information using the TLP prefix 302 of FIG. 3 to enable data encryption in the host system 200 of FIG. 2. Common elements between FIGS. 2, 3, and 4 are shown therein with common element numbers and will not be re-described herein.

With reference to FIG. 4, to write the unencrypted data 218 from the memory 216 to the storage device 202, the processor 212 creates the transaction descriptor 220 for the write task (block 402). The transaction descriptor 220 may include the write command and the first TT. Next, the processor 212 creates the write task in association with the first TT, the LBA, and a secret key at the ICE 210 via the write task signal 224. Subsequently, the processor 212 sends the write request 226 to the host interface controller 228 (not shown) in the storage device 202. In response to receiving the write request 226, the host interface controller 228 reads the transaction descriptor 220 from the host system 200 to obtain the write command and the first TT. In a non-limiting example, the host interface controller 228 may read the transaction descriptor 220 in one or more TLPs (not shown). Each of the one or more TLPs may include the TLP prefix 302 having the data indicator 312 set to indicate that the transaction-specific information is absent from the TLP prefix 302. The host interface controller 228 then sends the memory read request 230 to the PCIe RC 206. The memory read request 230 includes the TLP prefix 302 (not shown). The data indicator 312 (not shown) in the TLP prefix 302 is set to one (1) to indicate that the transaction-specific information is present in the TLP prefix 302. The TT 314 (not shown) includes the first TT, and the DBO 316 (not shown) includes a DBO corresponding to the write command as provided in the transaction descriptor 220.

The PCIe RC 206 extracts the secret key and the LBA from the LBA and key array (not shown) based on the first TT received in the TT 314 of TLP prefix 302 (block 404). The PCIe RC 206 then uses the LBA, the secret key, and the DBO 316 received in TLP prefix 302 to compute the IV according to Eq. 1 (block 406). The PCIe RC 206 then fetches the unencrypted data 218 from the memory 216 via the memory controller 214. The PCIe RC 206 then configures the ICE 210 to encrypt the unencrypted data 218 into the encrypted data 232 using the IV (block 408). Finally, the PCIe RC 206 provides the encrypted data 232 to the host interface controller 228 in the storage device 202.

Figure 5:
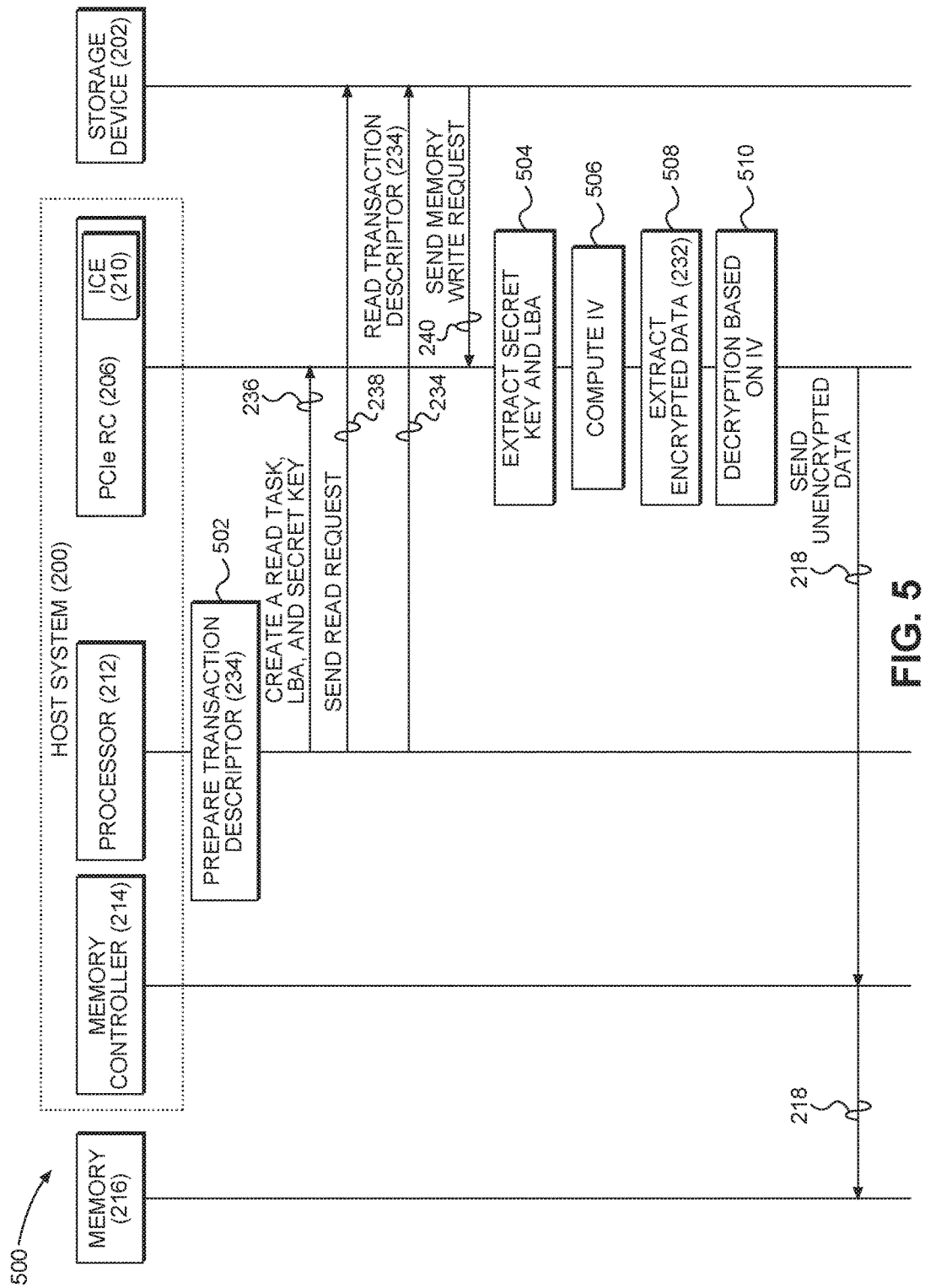
FIG. 5 is a signal flow diagram providing an exemplary illustration of conveying the transaction-specific information using the TLP prefix of FIG. 3 to enable data decryption in the host system of FIG. 2.

FIG. 5 is a signal flow diagram 500 providing an exemplary illustration of conveying the transaction-specific information using the TLP prefix 302 of FIG. 3 to enable data decryption in the host system 200 of FIG. 2. Common elements between FIGS. 2, 3, and 5 are shown therein with common element numbers and will not be re-described herein.

With reference to FIG. 5, to read the encrypted data 232 from the storage device 202 into the memory 216, the processor 212 creates the transaction descriptor 234 for the read task (block 502). The transaction descriptor 234 may include the read command and the second TT. Next, the processor 212 creates the read task in association with the second TT, the LBA, and a secret key at the ICE 210 via the read task signal 236. Subsequently, the processor 212 sends the read request 238 to the host interface controller 228 (not shown) in the storage device 202. In response to receiving the read request 238, the host interface controller 228 reads the transaction descriptor 234 from the host system 200 to obtain the read command and the second TT. In a non-limiting example, the host interface controller 228 may read the transaction descriptor 234 in one or more TLPs (not shown). Each of the one or more TLPs may include the TLP prefix 302 (not shown) having the data indicator 312 (not shown) set to indicate that the transaction-specific information is absent from the TLP prefix 302. The host interface controller 228 then sends the memory write request 240 to the PCIe RC 206. The memory write request 240 includes the TLP prefix 302. The data indicator 312 in the TLP prefix 302 is set to 1 to indicate that the transaction-specific information is present in the TLP prefix 302. The TT 314 (not shown) includes the second TT, and the DBO 316 (not shown) includes a DBO corresponding to the read command as provided in the transaction descriptor 234. The data payload 306 (not shown) includes the encrypted data 232 corresponding to the DBO in the DBO 316 of the TLP prefix 302.

The PCIe RC 206 extracts the secret key and the LBA from the LBA and key array based on the second TT received in the TT 314 of the TLP prefix 302 (block 504). The PCIe RC 206 then uses the LBA, the secret key, and the DBO 316 received in the TLP prefix 302 to compute the IV according to Eq. 1 (block 506). The PCIe RC 206 then extracts the encrypted data 232 from the memory write request 240 (block 508). The PCIe RC 206 then configures the ICE 210 to decrypt the encrypted data 232 into the unencrypted data 218 using the IV (block 510). Finally, the PCIe RC 206 provides the unencrypted data 218 to the memory 216 via the memory controller 214.

As illustrated in FIGS. 2, 4 and 5, the PCIe RC 206 is configured to compute the IV to enable data encryption and decryption by the ICE 210. Operations carried out by the PCIe RC 206 to compute the IV may be summarized in a generalized process to be discussed next. In this regard, FIG. 6 is a flowchart of an exemplary IV computation process 600 that is employed by the PCIe RC 206 of FIGS. 2, 4, and 5 to compute the IV for data encryption and decryption.

Figure 6:
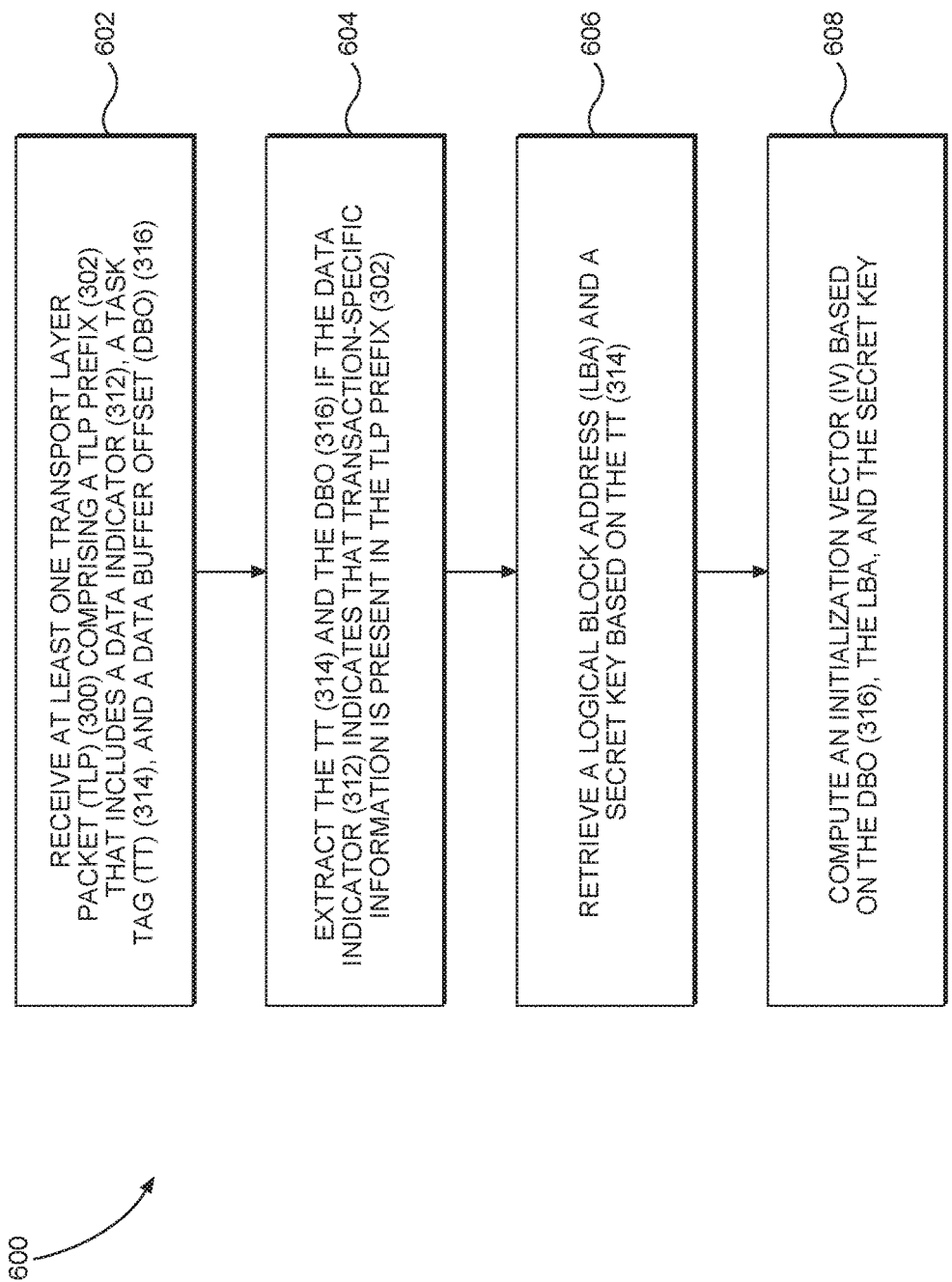
FIG. 6 is a flowchart of an exemplary initialization vector (IV) computation process that is employed by the host systems of FIGS. 2, 4, and 5 to compute the IV for data encryption and decryption.

With reference to FIG. 6, the PCIe RC 206 receives the TLP 300 including the TLP prefix 302 that includes the data indicator 312, the TT 314, and the DBO 316 (block 602). The PCIe RC 206 extracts the TT 314 and the DBO 316 if the data indicator 312 indicates that the transaction-specific information is present in the TLP prefix 302 (block 604). Next, the PCIe RC 206 retrieves the LBA and the secret key stored at the ICE 210 (e.g., in the LBA and key array) based on the TT 314 (block 606). Finally, the PCIe RC 206 computes the IV based on the DBO 316, the LBA, and the secret key (block 608).

As illustrated in FIGS. 2, 4 and 5, the host interface controller 228 is configured to convey the transaction-specific information to the PCIe RC 206 for computing the IV. Operations carried out by the host interface controller 228 may be summarized in a generalized process to be discussed next. In this regard, FIG. 7 is a flowchart of an exemplary information exchange process 700 that is employed by the host interface controller 228 of FIG. 2 to convey the transaction-specific information to the PCIe RC 206.

Figure 7:
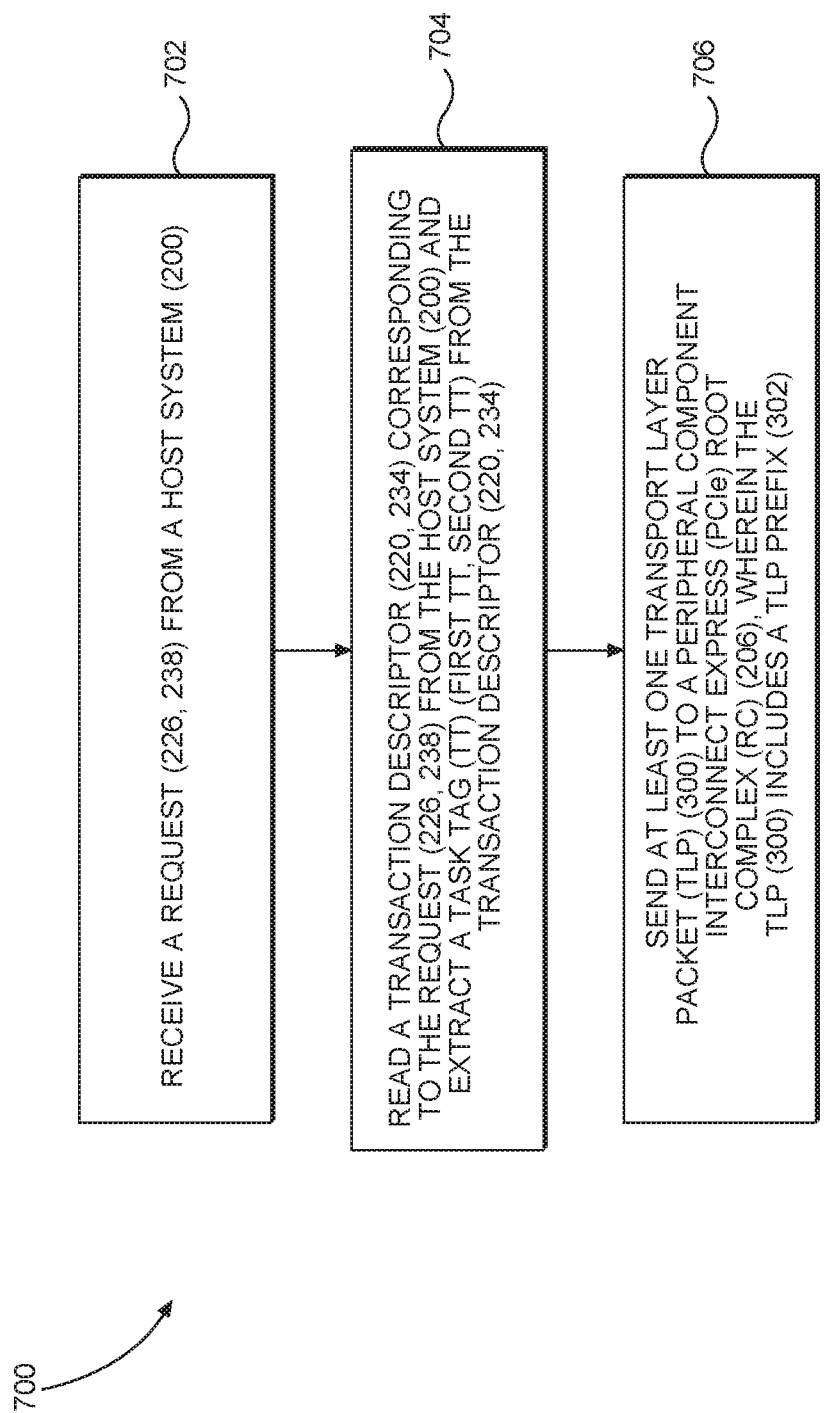
FIG. 7 is a flowchart of an exemplary information exchange process that is employed to convey the transaction-specific information to the host systems of FIGS. 2, 4, and 5.

With reference to FIG. 7, the host interface controller 228 receives a request, which may be the write request 226 or the read request 238, from the host system 200 (block 702). In response, the host interface controller 228 reads a transaction descriptor, which may be the transaction descriptor 220 for the write task or the transaction descriptor 234 for the read task, from the host system 200. The host interface controller 228 then extracts a TT, which may be the first TT or the second TT, from the transaction descriptor 220 or the transaction descriptor 234 (block 704). Finally, the host interface controller 228 sends the TLP 300 to the PCIe RC 206 and includes the TLP prefix 302 in the TLP 300 (block 706). The data indicator 312 in the TLP prefix 302 is configured to indicate that the transaction-specific information is present in the TLP prefix 302. The TLP prefix 302 also includes the first TT or the second TT in the TT 314, and includes the DBO in the DBO 316.

The ICE 210 for PCIe according to aspects disclosed herein may be provided in or integrated into any processor-based device, such as the host system 200 of FIG. 2, having a bus that has latency concerns. Examples, without limitation, include a set top box, an entertainment unit, a navigation device, a communications device, a fixed location data unit, a mobile location data unit, a mobile phone, a cellular phone, a smart phone, a tablet, a phablet, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile. While all such devices may benefit from the present disclosure, devices relying on a wireless connection and having an RFFE bus will see the greatest benefit from using aspects of the present disclosure.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To illustrate clearly this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A host system, comprising:
   at least one processor coupled to a system bus;
   a memory controller coupled to the system bus and configured to control a memory; and
   a peripheral component interconnect express (PCIe) root complex (RC) comprising an inline cryptographic engine (ICE), the PCIe RC coupled to the system bus and configured to receive at least one transport layer packet (TLP) from a storage device communicatively coupled to the PCIe RC, wherein the at least one TLP comprises a TLP prefix that includes a data indicator, a task tag (TT), and a data buffer offset (DBO) for enabling data encryption or decryption by the ICE.

2. The host system of claim 1, wherein the PCIe RC is further configured to:
   extract the TT and the DBO from the TLP prefix if the data indicator in the TLP prefix indicates that transaction-specific information is present in the TLP prefix;
   retrieve a logical block address (LBA) and a secret key stored at the ICE based on the TT; and
   compute an initialization vector (IV) based on the DBO, the LBA, and the secret key.

3. The host system of claim 2, wherein the at least one TLP further comprises a TLP header having a type field configured to indicate whether the at least one TLP is a memory read request or a memory write request.

4. The host system of claim 3, wherein if the type field in the TLP header indicates that the at least one TLP is the memory read request, the PCIe RC is further configured to: communicate with the memory controller to retrieve unencrypted data associated with the LBA from the memory;
   configure the ICE to encrypt the unencrypted data retrieved from the memory into encrypted data based on an encryption algorithm that encrypts using the IV; and
   provide the encrypted data to the storage device.

5. The host system of claim 4, wherein the ICE is configured to encrypt the unencrypted data based on an advanced encryption standard (AES) Xor-Encrypt-Xor (XEX) Tweakable Block Cipher with Ciphertext Stealing (XTS) (AES-XTS) algorithm or an AES Cipher Block Chaining (CBC) (AES-CBC) algorithm.

6. The host system of claim 3, wherein if the type field in the TLP header indicates that the at least one TLP is the memory write request, the PCIe RC is further configured to:
   extract encrypted data from the at least one TLP;
   configure the ICE to decrypt the encrypted data into unencrypted data based on a decryption algorithm that decrypts using the IV; and
   provide the unencrypted data to the memory controller for writing to the memory.

7. The host system of claim 6, wherein the ICE is configured to decrypt the encrypted data based on an advanced encryption standard (AES) Xor-Encrypt-Xor (XEX) Tweakable Block Cipher with Ciphertext Stealing (AES-XTS) or an AES Cipher Block Chaining (AES-CBC) algorithm.

8. The host system of claim 2, wherein the at least one processor is configured to:
   create a transaction descriptor for a write task, wherein the transaction descriptor comprises a write command and the TT;
   create the write task in the ICE in association with the TT;
   store the LBA and the secret key in association with the TT at the ICE; and
   send a write request to the storage device via the PCIe RC.

9. The host system of claim 2, wherein the at least one processor is configured to:
   create a transaction descriptor for a read task, wherein the transaction descriptor comprises a read command and the TT;
   create the read task in the ICE in association with the TT;
   store the LBA and the secret key in association with the TT at the ICE; and
   send a read request to the storage device via the PCIe RC.

10. The host system of claim 1 provided in an integrated circuit (IC).

11. The host system of claim 1 provided in a device selected from the group consisting of: a set top box; an entertainment unit; a navigation device; a communications device; a fixed location data unit; a mobile location data unit; a mobile phone; a cellular phone; a smart phone; a tablet; a phablet; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; and an automobile.

12. A method for supporting an inline cryptographic engine (ICE) in a peripheral component interconnect express (PCIe) root complex (RC), comprising:
   receiving at least one transport layer packet (TLP) comprising a TLP prefix that includes a data indicator, a task tag (TT), and a data buffer offset (DBO);

extracting the TT and the DBO from the TLP prefix if the data indicator in the TLP prefix indicates that transaction-specific information is present in the TLP prefix;
retrieving a logical block address (LBA) and a secret key based on the TT; and
computing an initialization vector (IV) based on the DBO, the LBA, and the secret key for enabling data encryption or decryption by the ICE.

13. The method of claim 12, further comprising retrieving the LBA and the secret key based on the TT from an LBA and key array.

14. The method of claim 12, further comprising receiving the at least one TLP that further comprises a TLP header having a type field configured to indicate whether the at least one TLP is a memory read request or a memory write request.

15. The method of claim 14, further comprising if the type field in the TLP header indicates that the at least one TLP is the memory read request:
retrieving unencrypted data associated with the LBA;
encrypting the unencrypted data into encrypted data based on an encryption algorithm that encrypts using the IV; and
providing the encrypted data to a storage device.

16. The method of claim 14, further comprising if the type field in the TLP header indicates that the at least one TLP is the memory write request:
extracting encrypted data from a data payload of the at least one TLP;
decrypting the encrypted data into unencrypted data based on a decryption algorithm that decrypts using the IV; and
providing the unencrypted data to a memory controller for writing to a memory.

17. The method of claim 12, further comprising:
creating a transaction descriptor for a write task, wherein the transaction descriptor comprises a write command and the TT;
creating the write task in the ICE in association with the TT;
storing the LBA and the secret key in association with the TT at the ICE; and
sending a write request via the PCIe RC.

18. The method of claim 12, further comprising:
creating a transaction descriptor for a read task, wherein the transaction descriptor comprises a read command and the TT;
creating the read task in the ICE in association with the TT;
storing the LBA and the secret key in association with the TT at the ICE; and
sending a read request via the PCIe RC.

19. A storage device configured to couple to a peripheral component interconnect express (PCIe) root complex (RC) in a host system, comprising a host interface controller configured to:
receive a request from the host system;
read a transaction descriptor corresponding to the request from the host system and extract a task tag (TT) from the transaction descriptor; and
send at least one transport layer packet (TLP) to the PCIe RC, wherein the at least one TLP comprises a TLP prefix that includes a data indicator configured to indicate that transaction-specific information is present in the TLP prefix for enabling data encryption or decryption by an inline cryptographic engine (ICE) in the PCIe RC.

20. The storage device of claim 19, wherein the host interface controller is further configured to send a memory read request in the at least one TLP if the request received from the host system is a write request.

21. The storage device of claim 19, wherein the host interface controller is further configured to send a memory write request in the at least one TLP if the request received from the host system is a read request.

22. The storage device of claim 21, wherein the host interface controller is further configured to include encrypted data in the at least one TLP.

23. The storage device of claim 19, wherein the host interface controller is further configured to read the transaction descriptor from the host system in one or more TLPs, each of the one or more TLPs comprising a respective TLP prefix in which the data indicator is configured to indicate that the transaction-specific information is absent from the respective TLP prefix.

24. An electronic device, comprising:
a memory;
a host system, comprising:
at least one processor coupled to a system bus;
a memory controller coupled to the system bus and configured to control the memory; and
a peripheral component interconnect express (PCIe) root complex (RC) coupled to the system bus and comprising an inline cryptographic engine (ICE); and
a storage device comprising a host interface controller communicatively coupled to the PCIe RC;
wherein the host interface controller in the storage device is configured to:
receive a request from the at least one processor in the host system;
read a transaction descriptor corresponding to the request from the host system and extract a task tag (TT) from the transaction descriptor; and
send at least one transport layer packet (TLP) to the PCIe RC, wherein the at least one TLP comprises a TLP prefix that includes a data indicator configured to indicate that transaction-specific information is present in the TLP prefix;
wherein the PCIe RC in the host system is configured to:
receive the at least one TLP from the storage device;
extract the TT and a data buffer offset (DBO) from the TLP prefix if the data indicator in the TLP prefix indicates that the transaction-specific information is present in the TLP prefix;
retrieve a logical block address (LBA) and a secret key stored at the ICE based on the TT; and
compute an initialization vector (IV) based on the DBO, the LBA, and the secret key for enabling data encryption or decryption by the ICE.

25. The electronic device of claim 24, wherein:
the host interface controller is further configured to send a memory read request in the at least one TLP if the request received from the host system is a write request; and
the PCIe RC is further configured to:
communicate with the memory controller to retrieve unencrypted data associated with the LBA from the memory;
configure the ICE to encrypt the unencrypted data retrieved from the memory into encrypted data based on an encryption algorithm that encrypts using the IV; and
provide the encrypted data to the storage device.

26. The electronic device of claim 24, wherein:
the host interface controller is further configured to send a memory write request in the at least one TLP if the request received from the host system is a read request, wherein encrypted data is included in the at least one TLP; and
the PCIe RC is further configured to:
   extract the encrypted data from the at least one TLP;
   configure the ICE to decrypt the encrypted data into unencrypted data based on a decryption algorithm that decrypts using the IV; and
   provide the unencrypted data to the memory controller for writing to the memory.

\* \* \* \* \*